(12) United States Patent
Boukobza

(10) Patent No.: US 10,717,560 B2
(45) Date of Patent: Jul. 21, 2020

(54) CONTAINER COMPRISING AN ARCHED BASE HAVING STIFFENING BOSSES DISTRIBUTED IN INTERLACED ANNULAR BANDS

(71) Applicant: SIDEL PARTICIPATIONS

(72) Inventor: Michel Boukobza, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 0 days.

(21) Appl. No.: 16/251,695

(22) Filed: Jan. 18, 2019

(65) Prior Publication Data

US 2019/0217985 A1    Jul. 18, 2019

(30) Foreign Application Priority Data

Jan. 18, 2018 (FR) ...................................... 18 50392

(51) Int. Cl.
| | |
|---|---|
| *B65D 1/02* | (2006.01) |
| *B29C 49/54* | (2006.01) |
| *B29C 49/06* | (2006.01) |
| *B65D 90/12* | (2006.01) |
| *B29C 49/48* | (2006.01) |
| *B29L 31/00* | (2006.01) |

(52) U.S. Cl.
CPC ............ *B65D 1/0284* (2013.01); *B29C 49/06* (2013.01); *B29C 49/541* (2013.01); *B65D 1/0276* (2013.01); *B29C 2049/4882* (2013.01); *B29C 2049/4892* (2013.01); *B29L 2031/7158* (2013.01)

(58) Field of Classification Search
CPC .... B65D 1/0284; B65D 1/0276; B29C 49/06; B29C 49/541; B29C 2049/4882; B29C 2049/4892; B29L 2031/7158
USPC .................................................. 215/373, 371
See application file for complete search history.

(56) References Cited

U.S. PATENT DOCUMENTS

| | | | | |
|---|---|---|---|---|
| 4,598,831 A | * | 7/1986 | Nakamura | ........... B65D 1/0276 215/373 |
| 4,993,566 A | * | 2/1991 | Eberle | ..................... B29C 49/48 215/373 |

(Continued)

FOREIGN PATENT DOCUMENTS

| | | |
|---|---|---|
| EP | 1 069 983 | 1/2001 |
| JP | 2005-231637 | 9/2005 |
| WO | 99/52701 | 10/1999 |

OTHER PUBLICATIONS

French Search Report, FR1850392, dated Sep. 25, 2018.

*Primary Examiner* — J. Gregory Pickett
*Assistant Examiner* — Niki M Eloshway

(57) ABSTRACT

Disclosed is a container made of plastic material including a body extending along a longitudinal axis between an opening and a base, the base having: a seat forming a setting plane for the container; a concave arch, rotational around the longitudinal axis and extending from the vicinity of the seat to an amorphous central zone; and stiffening bosses that protrude from the concave arch and that extend radially to the interior of the arch. The stiffening bosses are angularly spaced from one another by alternating first bosses and second bosses that are distributed along: a first annular band in which the first bosses extend; and a third annular band in which the second bosses extend.

16 Claims, 4 Drawing Sheets

(56) References Cited

U.S. PATENT DOCUMENTS

| | | | |
|---|---|---|---|
| 8,524,349 B2* | 9/2013 | Protais | B65D 1/0284 |
| | | | 215/373 |
| 9,045,249 B2* | 6/2015 | Miura | B65D 1/0276 |
| 2015/0298848 A1* | 10/2015 | Hermel | B65D 1/0284 |
| | | | 215/373 |
| 2016/0311599 A1* | 10/2016 | Stelzer | B65D 79/005 |
| 2017/0267394 A1* | 9/2017 | Lane | B65D 1/0223 |
| 2019/0322405 A1* | 10/2019 | Nakayama | B65D 1/0276 |

* cited by examiner

CONTAINER COMPRISING AN ARCHED BASE HAVING STIFFENING BOSSES DISTRIBUTED IN INTERLACED ANNULAR BANDS

The field of the invention is that of the design and manufacture of containers made of plastic material.

More specifically, the invention relates to the containers obtained by blow molding or stretch blow molding from blanks (preforms or intermediate containers that have undergone one or more previous blow-molding operations) made of plastic material.

The manufacture by blow molding of a container comprises a step for introducing, into a mold having the impression of the container, a blank previously heated to a temperature higher than the glass transition temperature of the constituent material of the preform (such as PET), and a step for injecting a pressurized fluid (such as air) into the blank. A stretching by means of a sliding rod can complete the blow molding.

This technique has been known for a long time. It is also recognized that the two-way molecular orientation (axial and radial) that the material undergoes during the blow molding or stretch blow molding is sometimes too weak to impart with certainty sufficient mechanical strength to the container. This lack of strength especially affects the base of the container, which undergoes significant dynamic stresses (during filling) and significant static stresses (after filling, by the pressure of the contents or as a consequence of a superposed stacking of packs).

It is known to stiffen the base of a container by imparting to it a recessed shape defining an arch designed to withstand the above-mentioned stresses. Since the sole presence of such an arch can prove to be insufficient, it has even been proposed to stiffen it by means of radial ribs formed by localized added thicknesses of material, as described in, for example, the U.S. patent document published under the number U.S. Pat. No. 4,525,401.

This structure, however, requires that an addition of material be allocated to the base, because of the added thicknesses created by the ribs.

This causes, on the one hand, an increase in the mass of the container, which clearly proves contrary to the current trends of material cost-savings.

This causes, on the other hand, difficulties of blowability ("blowability" is termed the ability of the container to be formed by blow molding, i.e., the ability of the material to conform properly to the impression of the mold), because the thickness of the material makes it difficult for it to be distributed by creep into the impressions of the mold that correspond to the ribs.

To rectify this, an ordinary solution can then consist in increasing the blow-molding pressure, but this solution necessitates revising upwards the abilities of the pneumatic injection circuit, at the expense of the energy balance of the manufacturing method.

Furthermore, it can be difficult to control the creep of the material in such a way that all of the ribs have the same characteristics, particularly in terms of mechanical strength. Therefore, there is a risk of deformation of the base of the container that can result in a lack of stability of the latter once filled and sealed.

Another solution consists in pushing up the constituent material of the base of the container, using for that, among other things, a special mold equipped with a mold bottom that is movable in translation that pushes up the material (cf. particularly the European patent document EP 1 069 983).

The pushing-up causes an increase in the rate of deformation of the material and therefore a mechanical augmentation of its crystallinity, the pushing-up phase imparting to the base of the container its final shape.

However, this technique, called "boxing," does not guarantee that the stiffness of the base will be sufficient and will not exempt the manufacturers from resorting to particular shapes that remain subject to the constraints of blowability.

The need consequently persists to propose shapes that are able to give to the base a good compromise between control of the amount of material, blowability and structural stiffness (in particular to withstand the deformations caused by an over-pressurization in the container, typically when the contents are a carbonated beverage).

The patent document published under the number WO 2013/156710, in the name of the applicant, aims in particular to meet this need. As illustrated in FIG. 1, this document proposes a container comprising a base 1 having an arch 2 that has, in cross-section, a star-shaped profile 3.

The star-shaped profile 3 is obtained by:
  an angular alternation of short arms 4 and long arms 5, the long arms 5 terminating in the immediate proximity of the seat 6 of the container while the short arms 4 are away from the seat 6,
  a multitude of facets 7 joining a short arm 4 to a long arm 5 that are contiguous to one another.

Even in the opinion of the inventors, this type of container provides excellent properties while having room for improvement, particularly in the area of the perception that the final customers can have of it.

The perception of the final customers is meant here both from a technical point of view and from an appearance point of view.

From the technical point of view, the proximity of the long arms 5 to the seat 6 can create manufacturing difficulties.

In fact, there is a risk that, during the blow molding of the container:
  either the material does not properly creep in the mold,
  or the properly creeped material pulls away from its predefined molding position.

This phenomenon can be observed in particular in the zone separating the star-shaped profile 3 from the seat 6. This zone in fact has a small span that can foster either an insufficient creep or a retraction of the material. This can result in a deformation of this zone and therefore a risk of instability of the container or simply a visual imperfection.

In other words, in this case, the seat 6 can be noticeably wavy with the result that it does not define a continuous setting plane but setting sections that, further, cannot be entirely coplanar, which thus affects the proper stability of the container.

The invention has as its main object to remedy the drawbacks of the prior art.

The invention has in particular the object of proposing a container having good mechanical characteristics while providing a good blowability.

The invention also has the object of proposing such a container that has a good stability, whether it is filled or empty.

The invention further has the object of proposing such a container having an enhanced esthetic appearance relative to the prior art.

These objects, as well as others that will emerge below, are attained as a result of the invention that has as its object a container made of plastic material comprising a body that extends along a longitudinal axis between an opening and a base, the base having:
- a seat forming a setting plane for the container;
- a concave arch, rotational around the longitudinal axis, and extending from the vicinity of the seat to an amorphous central zone;
- stiffening bosses that protrude from the concave arch and that extend radially to the interior of the arch, characterized in that the stiffening bosses are angularly spaced from one another by alternating first bosses and second bosses that are distributed along:
- a first annular band in which the first bosses extend from a first end in the vicinity of the seat to a second end, the first bosses forming a second annular band between their second end and the amorphous central zone;
- a third annular band in which the second bosses extend from a first end in the vicinity of the amorphous central zone to a second end, the second bosses forming a fourth annular band between their second end and the seat.

The alternation of the bosses distributed in bands makes it possible to stiffen the base effectively while having a pleasant design at which to look.

The alternating distribution of the first bosses and second bosses in two bands provides a proper distribution of the stresses exerted by the contents of the container on the arch, particularly when the contents are a carbonated beverage.

In addition, the alternation of the first bosses and the second bosses ensures a good performance of the seat, without thereby degrading the mechanical strength of the arch, which ensures a good stability for the container, whether it is filled or not.

Advantageously, the base has a fifth annular band, located between the second end of the first bosses and the second end of the second bosses, into which the first bosses and second bosses partially extend.

This fifth annular band exhibits a high mechanical strength for the base so that the arch is strong in a portion in which the stresses are great.

According to another characteristic, the arch comprises two separate zones, namely a first zone and a second zone, separated by a step, and the second end of the first bosses comes out in the second zone at a distance from the step between 25% and 65% of the total expanded length of this second zone, and the second end of the second bosses comes out in the first zone, at a distance from the step of between 25% and 65% of the total expanded length of this first zone.

Thus, in the fifth annular band, there is an annular overlay of the first bosses and of the second bosses.

Advantageously, the step has a step diameter $\emptyset_P$, and the seat has a seat diameter $\emptyset_A$, such that the ratio $\emptyset_P/\emptyset_A$ is between 0.5 and 0.85.

The presence of the step and its dimensions ensure that in the case of over-pressurization in the container, only the upper part of the arch, i.e., between the step and the amorphous central zone, can be inverted, so that the seat is not deformed and so that the container keeps its stability.

In this case, the step has a height $H_P$ and the arch extends over a height $H_V$, such that the ratio $H_P/H_V$ is between 0.4 and 0.8.

In other words, in a cross-section taken within this fifth annular band, it is noted that between two successive first bosses is a second boss, which creates an approximately star-shaped profile as in the prior art. This ensures a good mechanical strength, without this profile thereby presenting a risk to the stability of the container.

According to a preferred embodiment, the seat has a seat diameter $\emptyset_A$ (also called diameter $\emptyset_A$ of the seat), and the arch extends over a height $H_V$ such that the ratio $\emptyset_A/H_V$ is between 0.2 and 0.4.

Such a ratio ensures a good mechanical strength of the arch that is not at risk of collapsing. Furthermore, the blowability of the container is thus not affected.

Thus, in the case of down-turning of the upper part of the arch, the amorphous central zone will not be able to extend beyond the setting plane formed by the seat so that the stability of the container is maintained.

According to an advantageous embodiment:
- the arch is connected to the seat by an inner circular section with a radius of between 0.5 mm and 3 mm, and
- the seat is connected to a fillet for connecting the base of the container to the body of the container, by an outer circular section with a radius of between 1 mm and 5 mm.

Such dimensional values make it possible to prevent a roll-back of the base and a weakening of the arch.

In other words, these values make it possible to limit the expansion of the inner and outer circular sections, i.e., their tendency to adopt a rectilinear shape, which guarantees that the arch keeps a shape that makes it possible for it to withstand the pressure in the container.

Advantageously, the first bosses and the second bosses extend in respective arcs between their first respective ends and their second respective ends, each of the arcs having a radius of curvature of between 25% and 45% of the seat diameter $\emptyset_A$.

The dimensions of the radius of curvature of the first bosses and of the second bosses are selected so as not to affect the blowability of the container, while guaranteeing a good mechanical strength of the base.

Preferably, the container has a base that comprises at least five first bosses and five second bosses.

This number of bosses also makes it possible to ensure a proper stiffness to the base of the container without this affecting its blowability.

The invention also has as its object a mold for the manufacture of a container from a preform made of plastic material, the mold comprising two walls that are movable in relation to one another designed to form the body of the container and a mold bottom that is movable in relation to the walls to form the base of the container by pushing the constituent plastic material of the container back toward its opening, characterized in that the mold bottom comprises:
- a first annular part that is designed to form the seat at least partially;
- a second dome-shaped part that is designed to come into contact with an amorphous central zone of the preform to form the arch, the second part having:
- a first annular band of protrusions intended to form the first bosses in the vicinity of the seat,
- a second annular band of protrusions intended to form the second bosses in the vicinity of the amorphous central zone.

Other characteristics and advantages of the invention will emerge more clearly upon reading the following description of a preferred embodiment of the invention, given by way of illustrative and nonlimiting example, and accompanying drawings of which:

Figure 1:
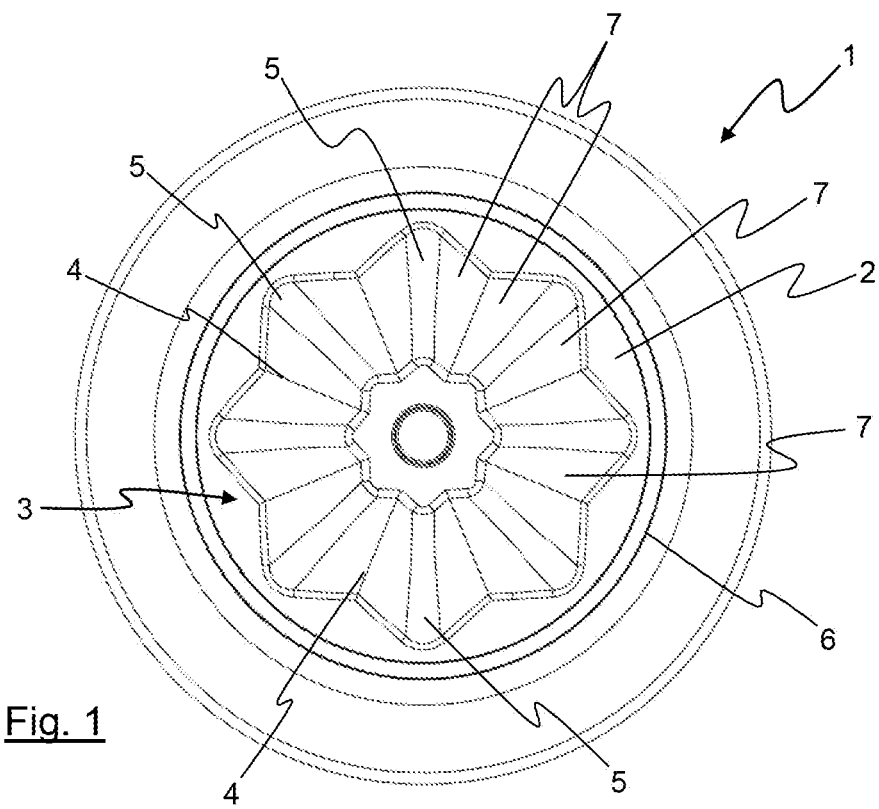
FIG. 1 is a bottom view of a container base according to the prior art.
Figure 2:
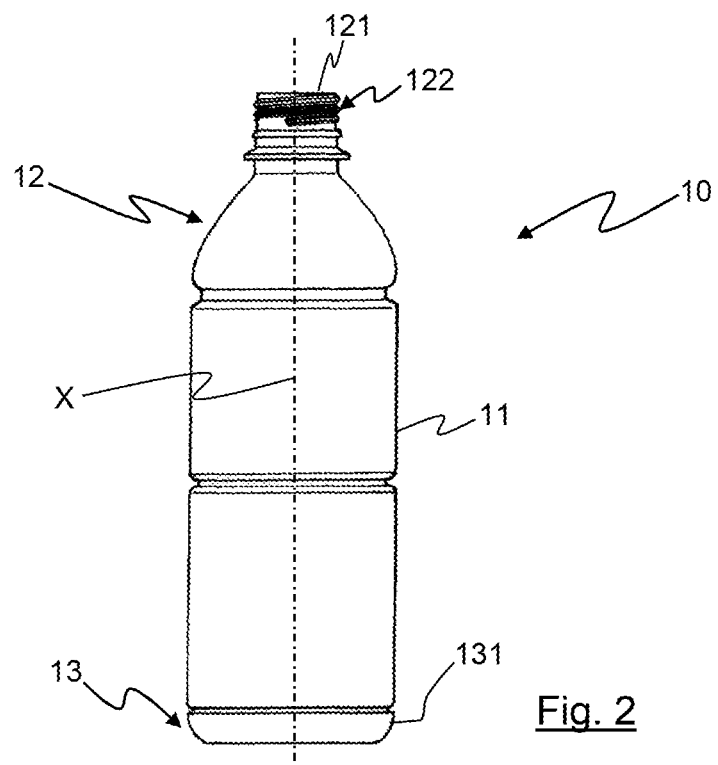
FIG. 2 is a front view of a container according to the invention.

As illustrated in FIG. 2, a container 10 according to the invention comprises a body 11 that extends along a longitudinal axis X between an opening 121 and a base 13. The opening 121 is typically at the end of a neck 122 located above a shoulder 12 topping the body 11.

More particularly, the container 10 is, in the embodiment illustrated, a bottle manufactured from a thermoplastic material such as PET (acronym for polyethylene terephthalate).

Figure 3:
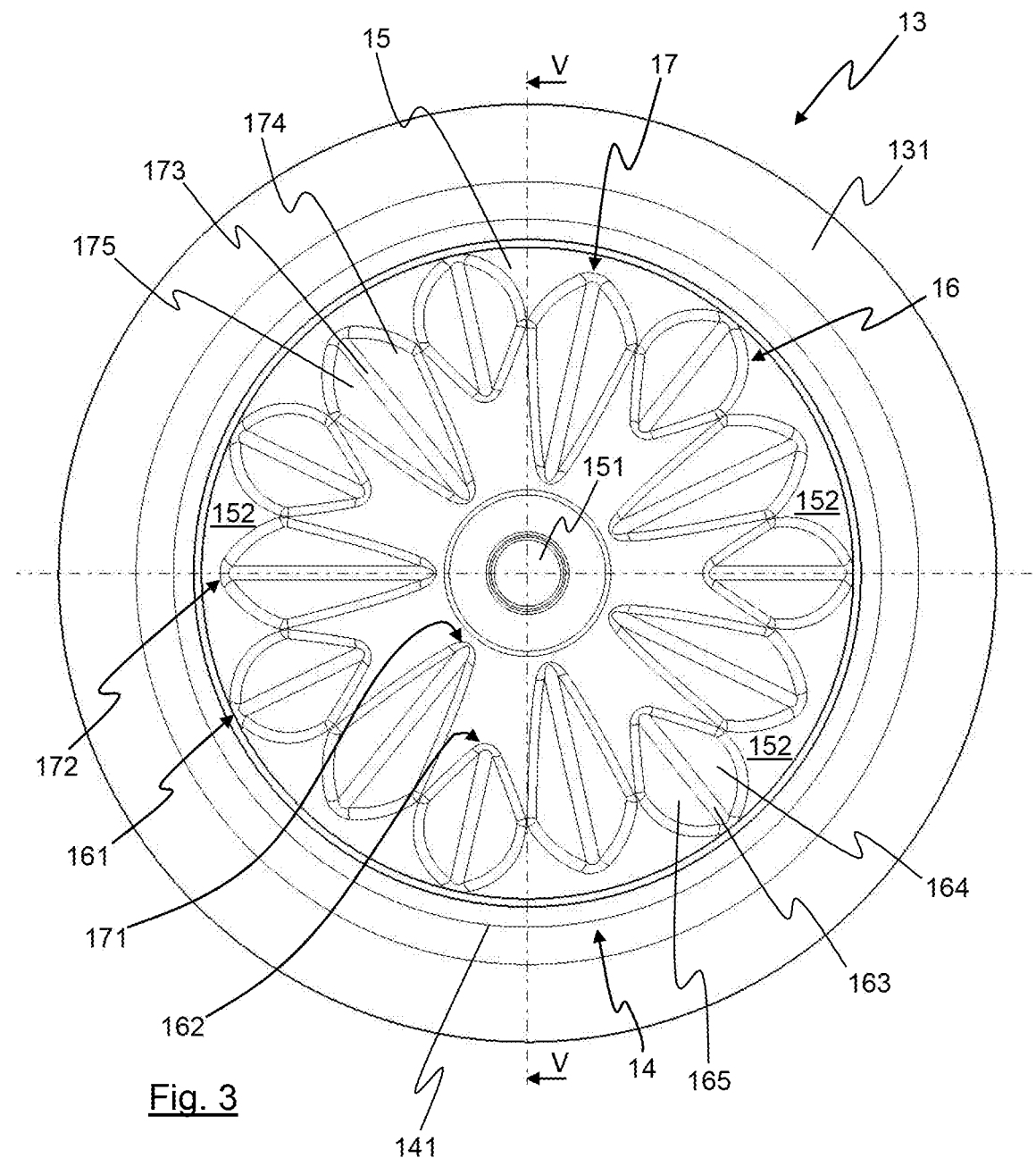
FIG. 3 is a bottom view of the base of the container according to the invention.
Figure 4:
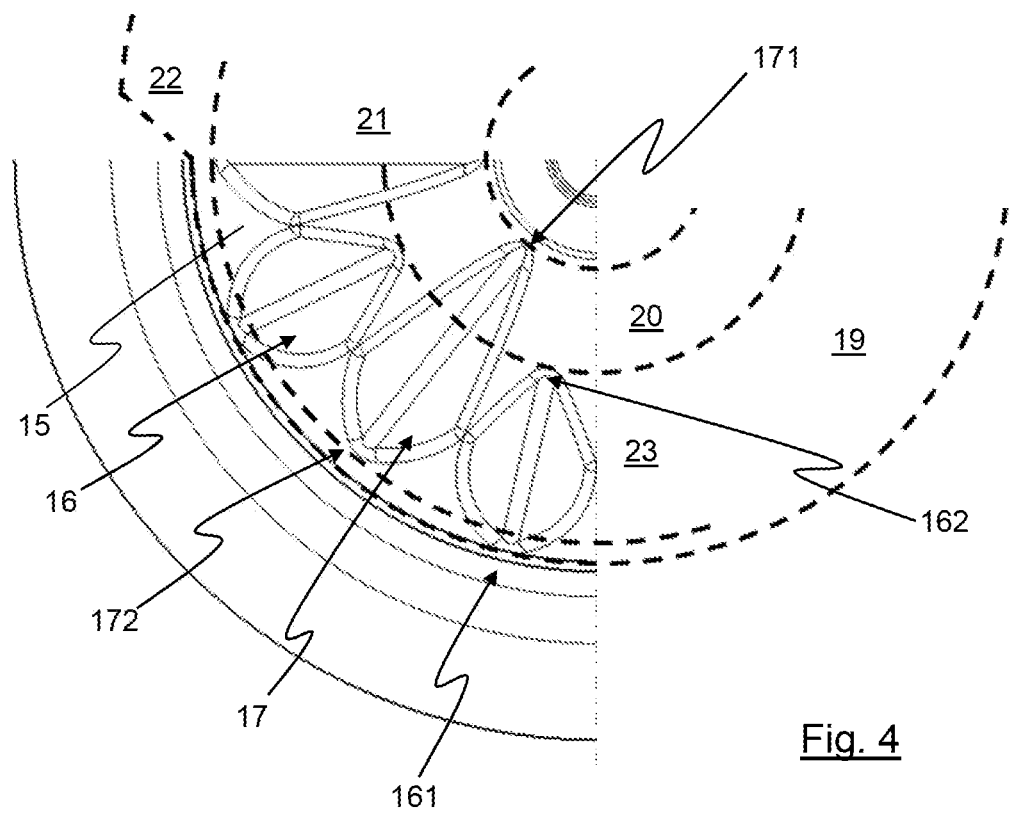
FIG. 4 is a detail view of the container base according to the invention.
Figure 5:
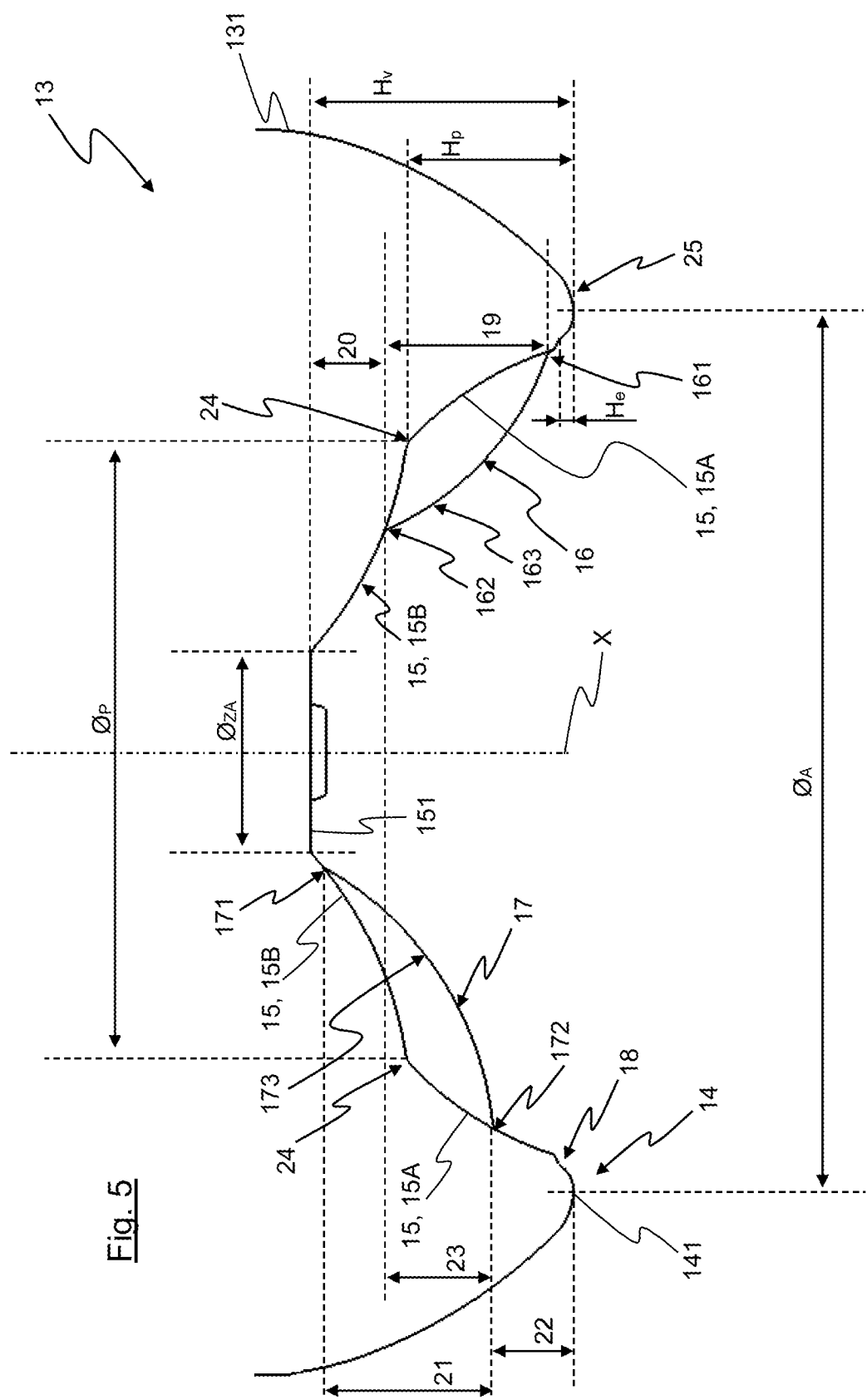
FIG. 5 is a view in cross-section of the base of the container according to the invention, along the axis V-V of FIG. 3.

The base 13, illustrated in FIGS. 3 to 5, comprises:
a seat 14,
a concave arch 15, and
stiffening bosses 16, 17 that protrude from the concave arch 15 and that extend radially in the interior of the arch 15.

The seat 14 forms a setting plane 141 for the container 10. The setting plane 141 takes approximately the shape of a circle on which the container 10 rests.

The seat 14 has a diameter $\emptyset_A$ (also called "diameter $\emptyset_A$ of the seat 14") defined as a function of the type and quantity of contents received in the container 10. Thus, for a large-capacity container 10, the diameter $\emptyset_A$ of the seat 14 will be greater than that of a small-capacity container 10. It is specified that the capacity is defined by the amount of material (for example of liquid) that the container 10 can contain.

In the following description, and in a conventional manner, all of the heights described are measured from the setting plane 141 of the container 10, which serves as a reference plane.

The arch 15 is rotational around the longitudinal axis X, and extends from the vicinity of the seat 14 to an amorphous central zone 151.

More specifically, the arch 15 is connected to the seat 14 by an inner circular section 18. The inner circular section 18 has a radius of between 0.5 mm and 3 mm. Preferably, the inner circular section 18 has a radius of 1.5 mm.

Further, the inner circular section 18 has a concave shape, i.e., it forms a cavity oriented toward the interior of the seat 14.

Between the inner circular section 18 and the amorphous central zone 151 of the arch 15, the latter comprises two separate zones 15A, 15B that form a step 24 between them. A first zone 15A is between the inner circular section 18 and the second zone 15B, which second zone 15B extends to the amorphous central zone 151. The first zone 15A is determined by an arc and has a concavity directed toward the interior of the arch (therefore toward the exterior of the container). Similarly, the second part 15B is also determined by an arc and has, in turn, a convexity toward the interior of the arch 15, so that the step 24 is defined by the change in curvature between the two parts. In other words, the step 24 constitutes the dividing line between the zones 15A, 15B. The diameter $\emptyset_P$ of the step 24 (also called "step diameter $\emptyset_P$") is defined as being the diameter of the change in curvature. It is therefore determined at the level of the step 24.

The step diameter $\emptyset_P$ is advantageously selected so that the ratio $\emptyset_P/\emptyset_A$ is between 0.5 and 0.85. Preferably, the ratio $\emptyset_P/\emptyset_A$ is 0.69.

Further, the step 24 is located at a height $H_P$, measured from the setting plane 141 of the container 10. The height $H_P$ is selected so that the ratio between step height $H_P$ and arch height $H_V$, $H_P/H_V$, is between 0.4 and 0.8.

To obtain a good mechanical strength of the base 13 of the container 10, the ratio $H_P/H_V$ is preferably 0.63.

As illustrated in FIG. 5, the arch 15 is thus separated from the setting plane 141 by a separation height $H_e$ of between 0.2 mm and 2 mm. Preferably, the separation height $H_e$ is 0.75 mm.

The amorphous central zone 151 appears in the form of a disk of material, with a diameter $\emptyset_{ZA}$, centered on the longitudinal axis X. This disk is not deformed during the blow molding of the container 10.

It is thus possible to define the height $H_V$ of the arch 15, which is measured between the setting plane 141 and the amorphous central zone 151 of the arch 15.

To guarantee the mechanical strength of the arch, the height $H_V$ of the arch 15 is defined so that the ratio $\emptyset_A/H_V$ is between 0.2 and 0.4.

Preferably, the height $H_V$ of the arch will be determined so that the ratio $\emptyset_A/H_V$ is equal to 0.29. Thus, a proper mechanical strength of the arch 15 will be obtained.

Still in reference to FIGS. 3 to 5, it is noted that the stiffening bosses 16, 17 are angularly spaced from one another by alternating the first bosses 16 and the second bosses 17.

The first bosses 16 extend between a first end 161 and a second end 162, in an arc 163 that has a radius of curvature of between 25% and 45% of the diameter $\emptyset_A$ of the seat.

The arc 163 of the first bosses 16 is connected to the arch 15 by a first facet 164 and by a second facet 165 that each extend on a side of the arc 163.

The facets 164, 165 of the first bosses 16 have a plane shape so that in cross-section, the first bosses 16 form a V. However, the facets 164, 165 could also have a curved shape.

The second bosses 17 extend between a first end 171 and a second end 172, in an arc 173 that has a radius of curvature of between 25% and 45% of the diameter $\emptyset_A$ of the seat.

The arc 173 of the second bosses 17 is connected to the arch 15 by a first facet 174 and by a second facet 175 that each extend on a side of the arc 173.

The facets 174, 175 of the second bosses 17 have a plane shape so that in cross-section, the second bosses 17 form a V. However, the facets 174, 175 could also have a curved shape.

Preferably, the base 13 of the container 10 comprises at least five first bosses 16 and five second bosses 17.

According to the embodiment illustrated in FIGS. 3 to 5, the base 13 comprises seven first bosses 16 and seven second bosses 17.

In all cases, it is necessary that the number of first bosses 16 and the number of second bosses 17 be identical.

The bosses 16, 17 are distributed in several annular bands, as is illustrated in FIGS. 3 to 5.

A first annular band 19 is defined in which the first bosses 16 extend from their first end 161 in the vicinity of the seat 14 to their second end 162, which is located in the second zone 15B of the arch 15, above the step 24, between it and the amorphous central zone 151.

The first bosses 16 then determine a second annular band 20 between their second end 162 and the amorphous central zone 151.

A third annular band 21 is defined, in which the second bosses 17 extend from their first end 171 in the vicinity of the amorphous central zone 151, in the second zone 15B of the arch 15, to their second end 172, which is located in the first zone 15A of the arch 15, between the step 24 and the seat 14.

The second bosses 17 determine a fourth annular band 22 between their second end 172 and the seat 14.

A fifth annular band 23 is bounded by the second end 162 of the first bosses 16 and the second end 172 of the second bosses 17. Thus, the first bosses 16 and the second bosses 17 each extend partially into this fifth annular band 23.

More particularly, the bosses 16 come out, by their second end 162, into the second zone 15B of the arch 15, at a distance from the step 24 of between 25% and 65% of the total expanded length of this zone 15B.

By "total expanded length" of the zone 15B is meant the measured length of the arc determining the zone 15B.

As for the bosses 17, they come out, by their second end 172, into the first zone 15A of the arch 15, at a distance from the step 24 of between 25% and 65% of the total expanded length of this zone 15A.

By "total expanded length" of the zone 15A is meant the length of the arc determining the zone 15A.

As illustrated in FIGS. 3 and 4, the first bosses 16 and the second bosses 17 are spaced apart from one another.

More specifically, a first boss 16 is separated from a second boss 17 by a distance that is less than or equal to 4 mm and preferably by a distance of about 1 mm.

However, to increase the mechanical strength of the base, it could be envisaged that a first boss 16 and a second boss 17 that are adjacent are in contact with one another, i.e., the distance separating them is zero.

As illustrated in FIGS. 3 to 5, the base 13 comprises a connecting fillet 131 by which the base 13 is connected to the body 11 of the container 10.

More specifically, with reference to FIG. 5, the seat 14 is connected to the connecting fillet 131 by an outer circular section 25. The outer circular section 25 has a radius of between 1 mm and 5 mm. Preferably, the outer circular section 25 has a radius of 3 mm.

Further, the outer circular section 25 has a convex shape, i.e., it forms a cavity oriented toward the interior of the container 10.

Figure 6:
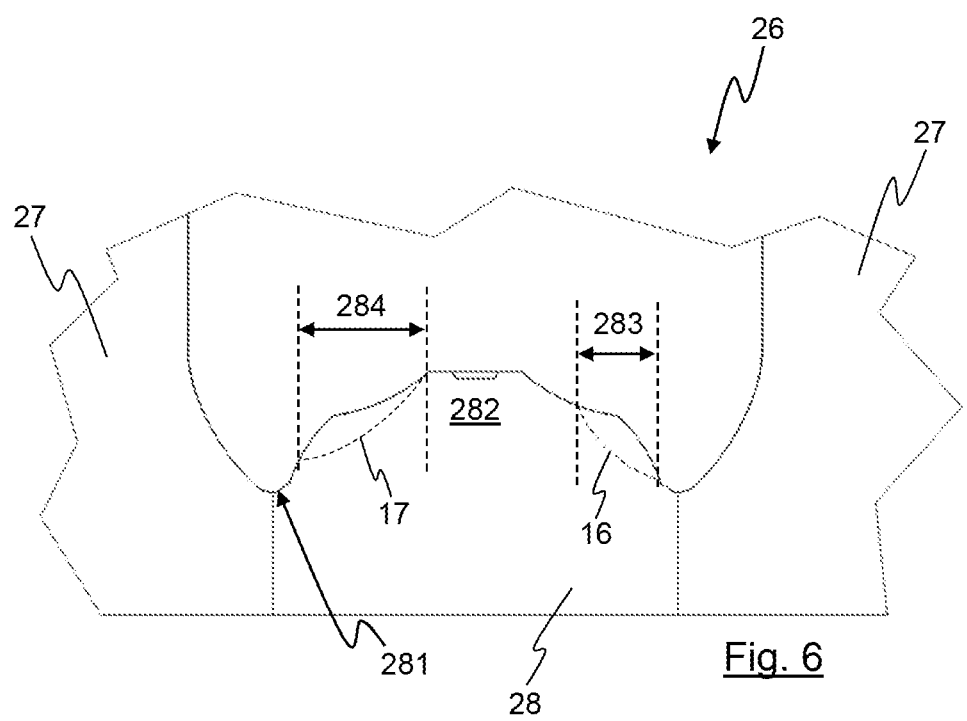
FIG. 6 is a view in longitudinal cross-section of a mold for manufacturing a container according to the invention.

To manufacture a container 10, and more particularly a base 13 as has been described, a mold 26, as illustrated in FIG. 6, is generally used.

Such a mold 26 comprises:
two side walls 27 designed to form the body 11 and the shoulder 12 of the container 10, and
a mold bottom 28 designed to form the base 13 of the container 10.

The two side walls 27 are movable, so as to be able to be separated or drawn near in relation to one another, for example similar to the opening of a wallet, to make possible the introduction of the blank (preform) of the container and then the removal of the formed container 10.

Advantageously, the mold bottom 28 is movable relative to the side walls 27 so as to make possible the mold release of the containers as well as the use of the previously defined boxing technique, i.e., to form the base 13 of the container 10 by pushing its constituent plastic material back toward its opening 121.

The mold bottom 28 comprises:
a first annular part 281 designed to form the seat 14 at least partially, and
a dome-shaped second part 282 designed to come into contact with an amorphous central zone of the preform to form the arch 15.

As shown in FIG. 6, the second part has:
a first annular band 283 of protrusions intended to form the first bosses 16 in the vicinity of the seat 14,
a second annular band 284 of protrusions intended to form the second bosses 17 in the vicinity of the amorphous central zone 151.

The base 13 that has just been described offers a good mechanical strength for the forces of a carbonated beverage contained in the container 10 while offering an attractive visual appearance. In fact, when seen from below, as shown in FIG. 3, the base 13 has a sunflower shape, the first bosses 16 and the second bosses 17 thus forming the petals of the sunflower.

Further, the risks of instability are limited, indeed eliminated, as a result of the first bosses 16 and the second bosses 17.

In fact, the separation between the first bosses 16 and the second bosses 17 makes it possible, on the one hand, to ensure that the material creeps properly in the mold 26 and, on the other hand, that the material does not pull out of its predefined molding position after the molding has been completed.

Further, the good creeping of the material and the absence of pull-out are also obtained as a result of the presence, on the arch 15, of a zone 152, between the seat 14, first bosses 16, and second bosses 17 that are inserted between two consecutive first bosses 16, which zone 152 has a surface that is superior to that present in the prior art.

Then, as a result, the first bosses 16 extend to the immediate proximity of the seat 14, which avoids creating a deformation of the latter that could cause an instability of the container 10.

The invention claimed is:

1. Container (10) made of plastic material comprising a body (11) extending along a longitudinal axis between an opening (121) and a base (13), the base (13) having:
a seat (14) forming a setting plane (141) for the container (10);
a concave arch (15), rotational around the longitudinal axis (X), and extending from the vicinity of the seat (14) to an amorphous central zone (151), the concave arch (15) comprising a first zone (15A) and a second zone (15B) separated from the first zone (15A) by a step (24);
stiffening bosses (16, 17) that protrude from the concave arch (15) and that extend radially to the interior of the arch (15),
wherein the stiffening bosses (16, 17) are angularly spaced from one another by alternating first bosses (16) and second bosses (17) that, are distributed along;
a first annular band (19) in which the first bosses (16) extend from a first end (161) in the vicinity of the seat (14) to a second end (162), the first bosses (16) forming a second annular band (20) between their second end (162) and the amorphous central zone (151), wherein the second end (162) comes out in the second zone (15B) at a distance from the step (24) of between 25% and 65% of the total expanded length of the second zone (15B); and
a third annular band (21) in which the second bosses (17) extend from a first end (171) in the vicinity of the amorphous central zone (151) to a second end (172), the second bosses (17) forming a fourth annular band (22) between their second end (172) and the seat (14), wherein the second end (172), comes out in the first zone (15A) at a distance from the step of between 25% and 65% of the total expanded length of the first zone (15A).

2. Container (10) according to claim 1, wherein the base (13) has a fifth annular band (23), located between the second end (162) of the first bosses (16) and the second end (172) of the second bosses (17), into which the first bosses (16) and second bosses (17) partially extend.

3. Container (10) according to claim 2, wherein the step (24) has a step diameter ($Ø_p$), and the seat (14) has a seat diameter ($Ø_A$), such that the ratio ($Ø_p/Ø_A$) is between 0.5 and 0.85.

4. Container (10) according to claim 3, wherein the step (24) has a height ($H_p$), and the arch (15) extends over a height ($H_v$), such that the ratio ($H_p/H_v$) is between 0.4 and 0.8.

5. Container (10) according to claim 3, wherein the seat (14) has a seat diameter ($Ø_A$), and the arch (15) extends over a height ($H_v$), such that the ratio ($Ø_A/H_v$) is between 0.2 and 0.4.

6. Container (10) according to claim 3, wherein:
the arch (15) is connected to the seat by an inner circular section (18) with a radius of between 0.5 mm and 3 mm, and
the seat (14) is connected to a fillet (131), for connecting the base (13) of the container (10) to the body (11) of the container (10), by an outer circular section (25) with a radius of between 1 mm and 5 mm.

7. Container (10) according to claim 2, wherein the step (24) has a height ($H_p$), and the arch (15) extends over a height ($H_v$), such that the ratio ($H_p/H_v$) is between 0.4 and 0.8.

8. Container (10) according to claim 7, wherein the seat (14) has a seat diameter ($Ø_A$), and the arch (15) extends over a height ($H_v$), such that the ratio ($Ø_A/H_v$) is between 0.2 and 0.4.

9. Container (10) according to claim 7, wherein:
the arch (15) is connected to the seat by an inner circular section (18) with a radius of between 0.5 mm and 3 mm, and
the seat (14) is connected to a fillet (131), for connecting the base (13) of the container (10) to the body (11) of the container (10), by an outer circular section (25) with a radius of between 1 mm and 5 mm.

10. Container (10) according to claim 2, wherein the seat (14) has a seat diameter ($Ø_A$), and the arch (15) extends over a height ($H_v$), such that the ratio ($Ø_A/H_v$) is between 0.2 and 0.4.

11. Container (10) according to claim 2, wherein:
the seat (14) connected to a fillet (131), for connecting the base (13) of the container (10) to the body (11) of the container (10), by an outer circular section (25) with a radius of between 1 mm and 5 mm.

12. Container (10) according to claim 1, wherein the seat (14) has a seat diameter ($Ø_A$), and the arch (15) extends over a height ($H_v$), such that the ratio ($Ø_A/H_v$) is between 0.2 and 0.4.

13. Container (10) according to claim 1, wherein:
the arch (15) is connected to the seat (14) by an inner circular section (18) with a radius of between 0.5 mm and 3 mm, and
the seat (14) is connected to a fillet (131), for connecting the base (13) of the container (10) to the body (11) of the container (10), by an outer circular section (25) with a radius of between 1 mm and 5 mm.

14. Container (10) according to claim 1, wherein the first bosses (16) and the second bosses (17) extend in respective arcs (163; 173) between their first respective ends (161; 171) and their second respective ends (162; 172), each of the arcs (163; 173) having a radius of curvature of between 25% and 45% of the diameter ($Ø_A$) of the seat (14).

15. Container (10) according to claim 1, further comprising at least five first bosses (16) and five second bosses (17).

16. Mold (26) for the manufacture of a container (10) according to claim 1 from a preform made of plastic material, the mold (26) comprising two walls (27) that are movable in relation to one another that are designed to form the body (11) of the container (10) and a mold bottom (28) that is movable in relation to the walls (27) to form the base (13) of the container (10) by pushing the constituent plastic material of the container (10) back toward its opening (121), wherein
the mold bottom (28) comprises:
a first annular part (281) that is designed to form the seat (14) at least partially;
a second dome-shaped part (282) that is designed to come into contact with an amorphous central zone of the preform to form the arch (15),
the second part (282) having:
a first annular band (283) of protrusions intended to form the first bosses (16) in the vicinity of the seat (14),
a second annular band (284) of protrusions intended to form the second bosses (17) in the vicinity of the amorphous central zone (151).

\* \* \* \* \*